United States Patent [19]

Taylor

[11] 4,434,375
[45] Feb. 28, 1984

[54] WAVE ENERGY CONVERTER

[76] Inventor: Robert N. Taylor, 211 Chapel Hill Dr., Battle Creek, Mich. 49015

[21] Appl. No.: 393,853

[22] Filed: Jun. 30, 1982

[51] Int. Cl.³ ............................................. F03B 13/12
[52] U.S. Cl. ....................................... 290/53; 60/498; 60/504; 417/333
[58] Field of Search ................... 290/42, 53; 417/330, 417/331, 333; 60/497, 498, 504

[56] References Cited

U.S. PATENT DOCUMENTS

| | | |
|---|---|---|
| 738,996 | 7/1903 | Hagen . |
| 882,269 | 2/1908 | Prather . |
| 974,869 | 5/1910 | Farmer . |
| 1,123,054 | 4/1914 | Winslow . |
| 1,175,287 | 4/1916 | Olmsted . |
| 1,439,849 | 8/1922 | Stodder . |
| 1,604,632 | 7/1926 | Carter . |
| 2,156,550 | 5/1939 | Snider ................................. 60/498 |
| 3,487,228 | 4/1969 | Kriegel . |
| 4,185,947 | 1/1980 | Menk ................................... 60/497 |
| 4,208,878 | 8/1980 | Rainey . |

Primary Examiner—J. V. Truhe
Assistant Examiner—Shelley Wade
Attorney, Agent, or Firm—Flynn, Thiel, Boutell & Tanis

[57] ABSTRACT

A power generation system for converting the motion of waves on a body of water such as a lake or sea to drive pumps, electrical generators or the like. A weighted float rides on the waves. A cable and pulley arrangement changes the direction, travel and force of the wave energy action imparted on the float and drives a hydraulic circuit. The hydraulic circuit includes an accumulator for temporary energy storage and release to assist in maintaining constant flow and pressure of hydraulic fluid to one or more hydraulic motors during each wave cycle. The hydraulic motor drives a load such as an electric generator. An automatically actuated device adjusts for high and low tides.

9 Claims, 10 Drawing Figures

WAVE ENERGY CONVERTER

BACKGROUND OF THE INVENTION

A multiplicity of devices and systems are known for converting wave and tidal energy. The prior art systems heretofore proposed have met with little success in being put to practical use due in part to lack of sufficient attention to the actual conditions found in the waves and tides. Hence, the float or other wave engaging devices heretofore proposed have often been incapable of meeting the widely varying environmental conditions extant in nature. The energy converting devices driven thereby likewise have often been incapable of proper matching of their efficient band (frequently narrow) of operation to the wide range of variable forces actually experienced in nature.

Some prior art devices compress air and use it as a driving force. Some pump water directly through waterwheels. Some others store water in an elevated reservoir to be used as a hydraulic head for a water turbine. Still others attempt a direct mechanical coupling to the ultimate load to be driven.

Accordingly, a need still exists for an economical and practical system that will allow for variations in the wave energy source and provide an efficient means of conversion of energy, tapped from that source, to a useable state.

Thus, an object of this invention is to provide a wave energy converter employing a float and harnessing mechanism connected to and driving a closed loop hydraulic circuit which pumps oil from a cylinder to a hydraulic motor and so arranged as to overcome the abovementioned disadvantages of the prior art.

A further object is to provide a wave energy converter which utilizes a novel combination of simple structures, which has a low initial cost of construction and installation and which has a high output.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a power generation system which converts the motion of waves on a body of water such as a lake or sea to drive pumps, electrical generators or the like, and includes a weighted float which rides on the waves. A cable and pulley arrangement changes the direction, travel and force of the wave energy action imparted on the float and drives a hydraulic circuit. The hydraulic circuit includes an accumulator for temporary energy storage and release to assist in maintaining constant flow and pressure of hydraulic fluid to one or more hydraulic motors during each wave cycle. The hydraulic motor drives a load such as an electric generator. An automatically actuated device adjusts for high and low tides.

BRIEF DESCRIPTION OF THE DRAWINGS

The drawings listed below are appended to this application.

DETAILED DESCRIPTION

A wave energy converter, hereinafter termed a WEC, 1 (FIG. 2) includes a fixed frame 5. The frame 5 comprises a horizontally spaced pair of pilings 14 driven vertical into, or otherwise fixed to, the ground 15 beneath a body of water. Spaced, horizontal upper and central beams 13 and 13a are fixed to and extend between the pilings 14 at the upper and central portions thereof, respectively. Beams 13 and 13a are preferably spaced at approximately equal distances above and below, respectively, the average level of the surface S of the water, such that at mid-tide (if in a body of water where tides exist) on a calm day (such that no waves are present) the surface S of the body of the water will lie approximately half way between the beams 13 and 13a. In the particular embodiment shown, the members of the frame 5 are shown as I beams welded together, but it will be understood that the frame 5 may be constructed of rigid members of any desired configuration rigidly fixed to each other to make the frame 5 rigid.

The frame 5 is preferably fixed to the ground, or bottom, 15 beneath the body of water at a distance from shore where the average depth H (FIG. 4B) of the water as measured on a calm day at mid-tide as abovementioned is substantially twice the expected maximum wave height for this portion of the body of water. The beams 13 and 13a are vertically separated sufficient to avoid immersion of top beam 13a in the expected maximum height wave at high tide or expected high water. Since in water shallower than twice wave height a wave will normally crest over, surf or break, instead of rising and falling as it does in deeper water, the aforementioned depth at which the frame 5 is located automatically avoids its encountering, and possibly being damaged by, wave cross sections steepened, to crest or surf as above mentioned, due to excessively shallow depth.

The WEC 1 further includes a wave harnessing apparatus 10 (FIG. 2) and, in the preferred embodiment shown, a tide adjuster 18 both carried by the frame 5 and discussed hereinafter.

Figure 2:
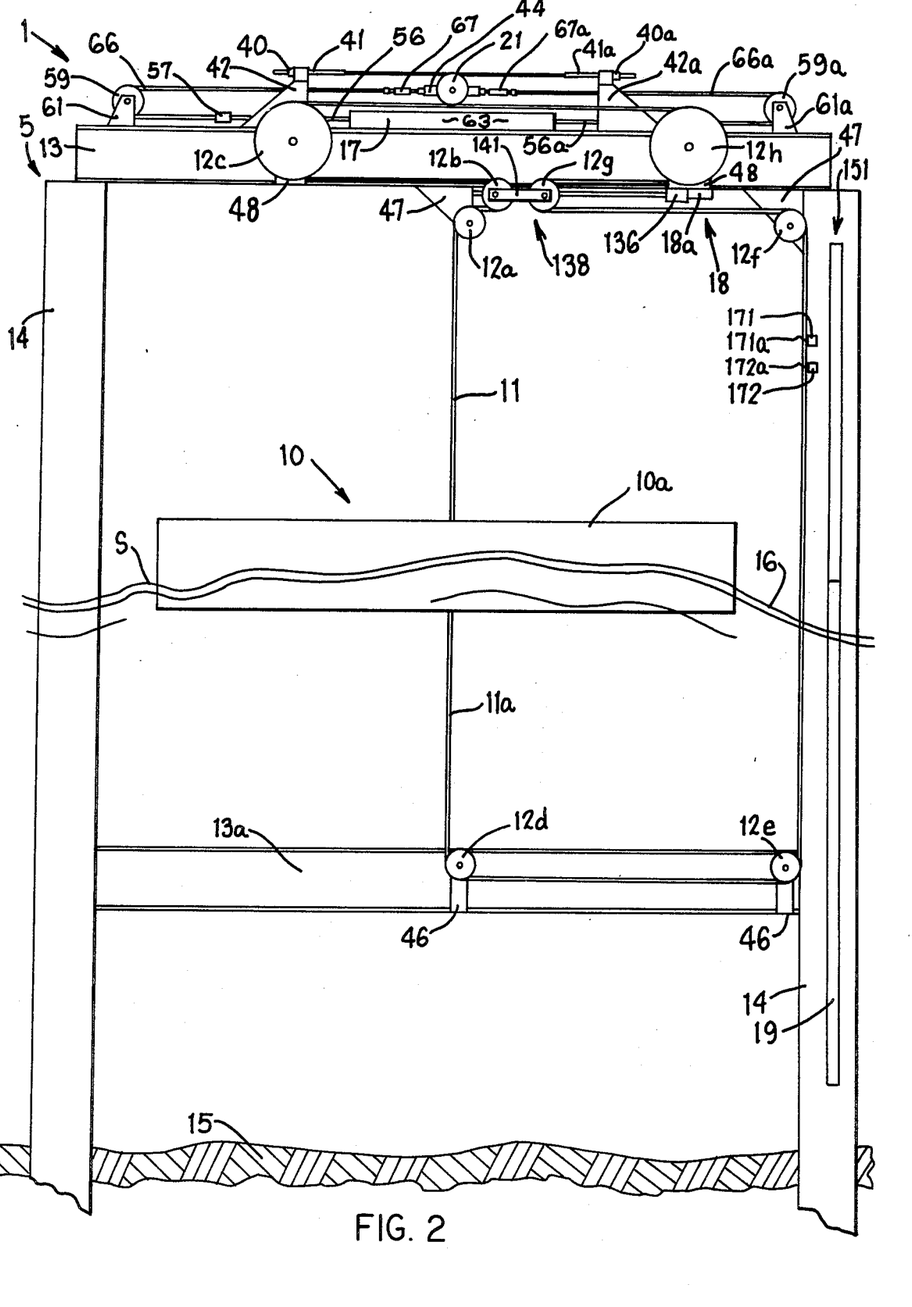
FIG. 2 is an elevational view of an embodiment of the invention showing the float, superstructure and tide adjuster mechanism.

The harnessing apparatus 10 comprises a weighted float 10a located within the perimeter defined by frame members 13,13a and 14 as seen in FIG. 2 and adapted to float on the surface S of the water and thus be driven up and down within the confines of the frame members as the surface S rises and falls in waves.

The wave harnessing apparatus further includes a cable system comprising cables 11 and 11a (which may be cables, chains or other conventional elongate flexible tension members). The upper cable 11 extends from the top of the float 10a upward to bend through approximately 90° around a substantially right angle direction change pulley 12a, then rightward to a direction reversing pulley 12b, leftward to an enlarged direction reversing pulley 12c, and then rightward to a floating double pulley 21 and then leftward to a cable tensioning screw 41 axially adjustable by a nut 40 on a bracket 42 fixed atop the upper beam 13. Lower cable 11a is routed downward over a right angle pulley 12d rightwardly past a further right angle pulley 12e, thence upward along the rightward pile 14 to a still further right angle pulley 12f, then leftwardly to and around a direction reversing pulley 12g, thence rightwardly around a further direction reversing pulley 12h, then back leftwardly to and about 180° around a second sheave of the floating double pulley 21 and thence finally rightward to a further cable tensioning screw 41a axially adjustable by a nut 40a on a further bracket 42a in turn fixed atop the upper beam 13. If desired, conventional turnbuckles (not shown) or other tensioning means may secure the ends of cables 11 and 11a to the brackets 42 and 42a, in place of screws 41,41a and nuts 40,40a.

Pulleys 12d and 12e are rotatably mounted on plates 46 fixed on the lower beam 13a, right angle pulleys 12a and 12f are rotatably mounted on brackets 47 fixed beneath the upper beam 13, and reversing pulleys 12c and 12h are mounted for rotation on plates 48 fixed on the upper beam 13. These plates and brackets are fixed to the beams 13 and 13a preferably by welding. The above-described pulleys, sheaves, cables and tensioning screws are preferably substantially coplanar.

Floating double sheave pulley 21 has its double sheaves rotatably supported on a traveler block 51 which is free to reciprocate back and forth between the spaced upstanding brackets 42 and 42a. Direction reversing pulleys 12b and 12g are rotatably mounted and may have their axes fixedly mounted with respect to the beam 13a. However, in the preferred embodiment shown, the axes of such pulleys 12b and 12g are mounted for adjustment along the underside of beam 13 on a portion of the tide adjuster 18 for repositioning of the pulleys 12b and 12g simultaneously to the right or simultaneously to the left in respective dependence on the rise or fall of the tide as monitored by the tide adjuster 18.

Figure 3:
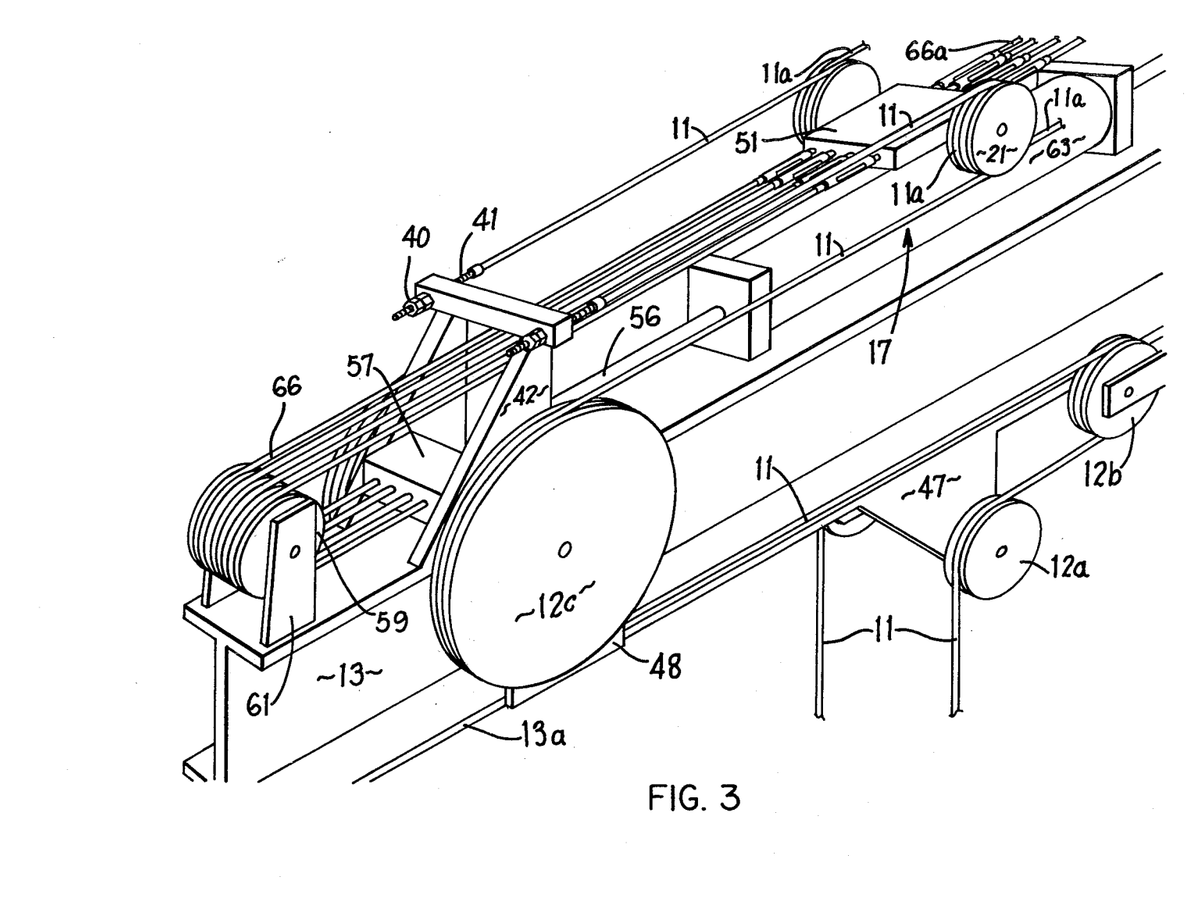
FIG. 3 is an enlarged fragmentary pictorial view of the FIG. 2 structure showing the cylinder, cable and double purchase pulley mechanism.
Figure 6:
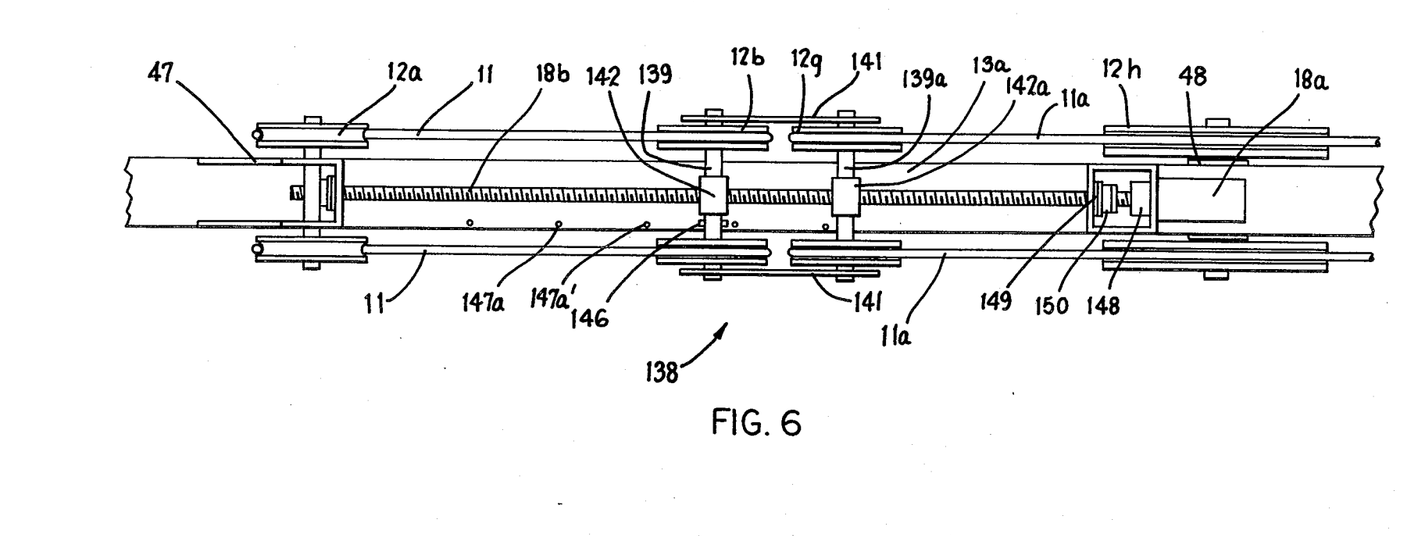
FIG. 6 is an enlarged bottom view of a portion of the tide adjuster mechanism of FIG. 2.

The abovedescribed set of cables 11,11a and pulleys 12a–12h and 21 and tensioning screws 41,41a is provided on the front side (as seen in FIG. 2) of the frame 5. To avoid any tendency of the float or floating pulley 21 to skew under load, lateral symmetry is maintained by providing a second set of cables, pulleys and tensioning screws on the back side of the frame 5 (as seen in FIGS. 3 and 6) aligned behind corresponding abovedescribed elements of the first set on the front side of the frame. Elements of the second (back) set are referred to below by the same reference numerals as the aligned elements of the abovedescribed (front) set.

Preferably, the ends of the float 10a are spaced from the pilings 14 and the float 10a is prevented from moving into contact with the pilings 14 by suitable tensioning of the cables 11 and 11a at the front and back sets.

A pressure fluid cylinder unit 17 is centrally fixed atop the upper beam 13 in longitudinal parallelism therewith. The unit 17 serves as a wave driven pressure fluid pump. The cylinder unit 17 has oppositely extending piston rods 56 and 56a which reciprocate together in the same direction (for example, both to the left and then both to the right) with mounting blocks 57 and 57a fixed on the free ends thereof to move freely through openings in the brackets 42 and 42a and away from respective multi-sheave pulleys 59 and 59a rotatably mounted on brackets 61 and 61a fixedly mounted atop opposite end portions of the top beam 13. It is contemplated that the cylinder unit 17 may comprise a pair of end-to-end or side-by-side mounted single ended cylinders (not shown) each having its own piston and a single piston rod such that the two cylinders provide between them a pair of piston rods like those shown at 56 and 56a. However, in the preferred embodiment shown, the cylinder unit 17 comprises a single cylinder 63 carrying a single piston 64 from opposite ends of which extend the two piston rods 56 and 56a. Corresponding sets of cables 66 and 66a l are each fixedly mounted at one end by any convenient means not shown to the corresponding piston rod end blocks 57 and 57a and extend therefrom toward and up and around the corresponding pulley set 59 or 59a and then extend horizontally in the reverse direction back toward the corresponding end of the traveling block 44 to which they are fixed by cable tensioning means, here in the form of respective sets of turnbuckles 67 and 67a (FIGS. 2 and 3), though tensioning devices of other types may instead be employed if desired.

The double purchase pulley arrangement 21 provides a two to one mechanical advantage to thereby apply to each piston rod 56,56a double the tensile force applied by the float 10a to the cables 11,11a. Thus, if comparable diameter (i.e., strength) cable is used throughout the system, it is appropriate to double the number of cables 66,66a running from the traveling block 51 as run from the float 10a. Thus, the abovedescribed structure reciprocates the piston rods 56,56a in response to vertical reciprocation of the float 10a by the rise and fall of the waves upon which it floats.

The harnessing apparatus 10 of the preferred embodiment includes a hydraulic circuit 110 (FIG. 5) driven by reciprocation of the piston 64 of cylinder unit 17. To provide a usable energy output, conveniently in the form of electricity, the circuit 110 is filled with an incompressible or substantially incompressible fluid, preferably conventional hydraulic oil. Use of a fluid such as water is contemplated but is not preferred since it may introduce operational problems such as corrosion and freezing in cold weather.

Figure 5:
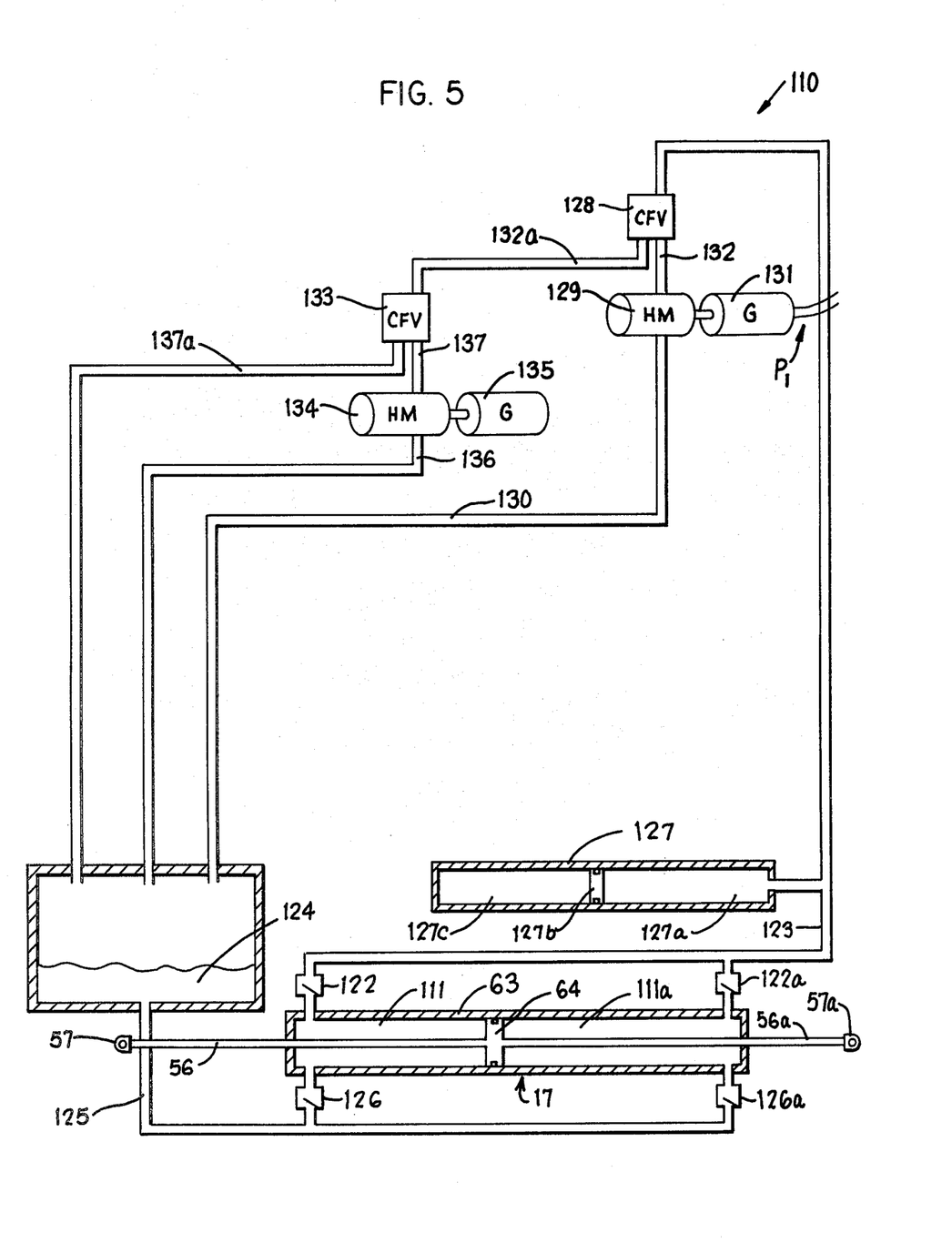
FIG. 5 is a schematic view of the hydraulic circuit of the FIG. 2 embodiment of the invention.

Concerning the hydraulic circuit 110 in more detail, cylinder 63 contains hydraulic chambers 111 and 111a on opposite sides of piston 64. Reciprocation of the piston 64 draws hydraulic fluid from a reservoir 124 through a line 125 alternatively through inlet check valves 126 and 126a respectively connected to the remote ends of cylinder chambers 111 and 111a. As the reciprocating piston draws hydraulic fluid into one of chambers 111 or 111a, it simultaneously forces hydraulic fluid out of the other, alternately through outlet check valves 122 and 122a which connect from the remote ends of chambers 111 and 111a respectively through a common line 123. The latter branches to a conventional resiliently loaded accumulator 127 and a conventional constant flow valve 128. The accumulator 127 comprises a hydraulic chamber 127a open to hydraulic line 123, a movable piston 127b and a closed pressurized nitrogen gas filled chamber 127c backing the piston 127b and hence creating a resilient load against the hydraulic fluid in chamber 127a. Constant flow valve 128 receives hydraulic fluid at high pressure from cylinder unit 17 and accumulator 127 and provides a constant flow of hydraulic oil at a prespecified pressure through constant flow outlet line 132 to a hydraulic motor 129 which through any convenient drive means drives a useful load, such as an electric generator having electric power output lines $P_1$. Spent hydraulic fluid from the motor 129 is directed through a pipe 130 back to the reservoir 124. In the preferred embodiment shown, an excess flow pipe 132a directs all fluid not required by motor 129 to a second constant flow valve 133 which, in the manner described above with respect to valve 128, directs the constant hydraulic flow through pipe 137 to a further hydraulic motor 134 in turn driving a further load (here another electric generator) 135 and wherein spent hydraulic fluid from the motor 134 empties through a pipe 136 back into the reservoir 124. Although further constant flow valves can be added, in the particular embodiment shown, the excess flow from valve 133 is led through a further pipe 137a back to the reservoir 124. In this way, the number of electric generators driven will automatically increase as wave energy (peak-to-trough height) increases. Yet each generator that is driven will provide a standardized electrical output (DC voltage or AC frequency) suitable for driving commercially available electrically powered devices and/or application to a commercial power line network.

The tide height adjuster 18 will normally be added to the harnessing apparatus 10 abovedescribed where the latter is used on a body of water which is subject to a gradual rise and fall in average level (in addition to the rapid rise and fall of water surface waves) which gradual rise and fall will typically be tidal but in some instances may be due to rainfall cycles or other conditions that may cause significant changes in water level in a given body of water in which wave energy is to be harvested. In the preferred embodiment shown, the tide height adjuster 18 comprises a reversible DC adjuster motor 18a fixed by a bracket 136 beneath upper beam 13 (FIG. 6). The rotatable output shaft of the motor 18a axially connects through a coupling 148 to elongated screw 18b to reversibly rotate same. The near end of screw 18b is supported on bracket 136 by antifriction thrust bearings 149 and nuts 150 in a conventional manner. The remote end of screw 18b is supported for rotation on the bracket 47 in a similar fashion. The screw 18b extends parallel to the longitudinal axis of the beam 13 in close spaced relation below the bottom surface of the latter.

Figure 7:
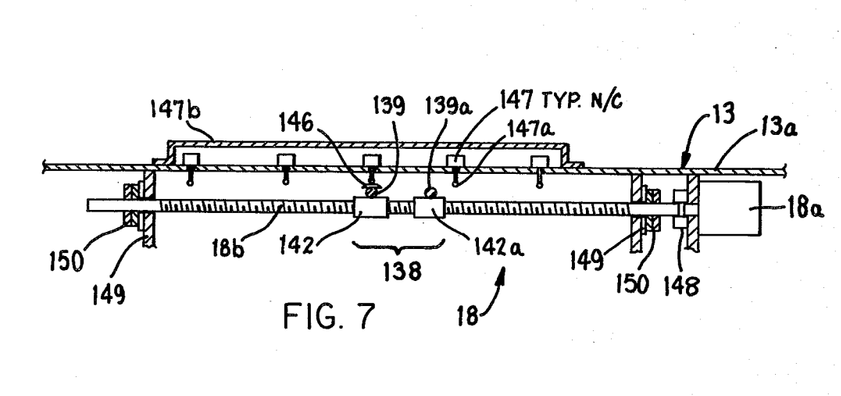
FIG. 7 is a partially broken side view of the tide adjuster mechanism of FIG. 6.

A carriage generally indicated at 138 (FIGS. 6 and 7) is adjustable rightwardly or leftwardly along the underside of beam 13 by rotation of the screw 18b by motor 18a in one rotative direction or the other. The carriage 138 supports for rotation thereon the front and rear sets of direction reversing pulleys 12b and 12g. In the particular embodiment shown, the carriage 138 takes the form of a pair of axles 139 and 139a (FIG. 6) fixedly connected by end straps 141, rotatably carrying the respective wheel pairs 12b and 12g and having respective central members 142 and 142a threadedly receiving the screw 18b therethrough. The tension in the cables 11 and 11a prevents rocking of the carriage 138 about the axis of the screw 18b and with respect to the beam 13 when the motor 18a rotates the screw.

A plurality of normally closed limit switches 147 (FIGS. 6, 7 and 9) are fixed atop the lower flange 13a of upper I beam 13 and have activator fingers, or plungers, 147a protruding downward through holes in the beam flange 13a along the path of the carriage 138 for activation by such carriage as it is moved rightwardly or leftwardly by the motor 18a. More particularly, the carriage 138 carries a switch actuating ramp 146 which when engaged with a finger 147a opens the corresponding limit switch 147 located above the carriage.

The tide height adjuster 18 further includes a tide level sensing portion generally indicated at 151 (FIGS. 2 and 8) which comprises an elongate tube 19 affixed vertically to the rightward pile 14 in FIG. 2. The tube 19 is open at the top and bottom and extends from near the top beam 13 downward to near the bottom 15. By placing the open tube bottom at a depth below water level equal to at least about twice expected maximum wave height, at which depth water particle motion due to the surface waves is known to be very small or insignificant compared to surface wave height, the water level $L_t$ in the tube 19 tests to stay substantially constant halfway between the top and trough of waves outside the tube 19. Thus the level $L_t$ in the tube 19 is essentially independent of wave height but rather will rise and fall with changes in the average level of the body of water due to tides and similar low frequency changes in water level.

A sensor float 158 is freely vertically movable in the tube 19 and rides on the water surface therein at the level $L_t$, so as to rise and fall with such level and thereby measure calm (mean) water height. Fixed to and extending from the top of sensor float 158 is an upstanding switch actuator rod 159 located radially within the tube 19 for free vertical movement therein by suitable guide means preferably adjacent the top and bottom thereof bearing on the tube 19, such guide means including for example a slide block 159a fixed near the top of rod 159, and the float 158 itself near the bottom of rod 159. The top of rod 159 carries a switch actuator ramp 160 fixedly thereon. A plurality of limit switches 162 of normally open type (FIGS. 8 and 9) are fixed with respect to and spaced along the upper portion of vertical tube 19. As the float 158 moves vertically in the tube 19, the switch actuator ramp 160 is thereby moved vertically to close successive switches 162 and thereby indicate the present calm water level $L_t$. Each switch 162 has an actuator 162a lying in the path of the switch actuating ramp 160 for actuation of the corresponding switch 162 thereby. In the particular embodiment shown in FIG. 8, the switch actuator ramp 160 protrudes slidably through a slot 161 cut vertically in the sidewall of tube 19 to engage with the switch actuators 162a which are located outside the tube 19. Alternately, the switch actuators 162a may protrude through individual holes in the sidewall of tube 19 and the actuator ramp 160 may be wholly contained within the tube 19 to engage same, substantially as shown with respect to switch actuators 147a and ramp 146 abovedescribed with respect to FIG. 7. The switches 147 and 162 are preferably of waterproof type so as to be unaffected by water, waves or spray. If desired, protective covers 147b and 162b may be fixed to the surface 13a of beam 13 and to the sidewall of tube 19 to cover the switches 147 and 162 respectively. In the embodiment shown in FIG. 8, the switches 162 may be mounted to the tube 19 by fixed mounting on the cover 162b. The covers 147b and 162b may be removable for servicing.

A waterproof direction sensing switch 163 may be of the conventional type used, for example, in commercially available sump pumps and the like, in that its actuator finger 164 which bears frictionally on the rod 159 is actuated upward or downward by the initial portion only of a corresponding upward or downward movement of the float, wherein continued movement of the float in the same direction simply causes the rod 159 to slide with respect to the actuator 164. Thus, whenever the float 158 changes direction of movement the rod 159 effects a corresponding change in state in the switch 163. In the embodiment shown, switch 163 is a triple pole double throw switch. Switch 163 is fixedly mounted with respect to the tube 19 and in the particular embodiment shown is supported by the cover 162b and has its friction actuable finger 164 protruding through the slot 169 into friction engagement with the rod 159.

The sensing device 151 further includes a pair of single pole, single throw direction sensing switches 171 and 172, again of waterproof type, fixed on the rightward (FIG. 2) pile 14 and having actuator fingers 171a and 172a frictionally engaging the rightward vertical reach of float cable 11a. Switches 171 and 172 are normally open switches oriented such that switch 171 closes only on the downstroke of the engaged portion of cable 11a (and hence on upward movement of the float 10a) and wherein switch 172 is closable only on the up stroke of the engaged portion of cable 11a (and hence only on the downstroke of float 10a).

The switches 171 and 172 again are of waterproof type and are fixed by any convenient means on the piling 14 above normal water level.

Figure 9:
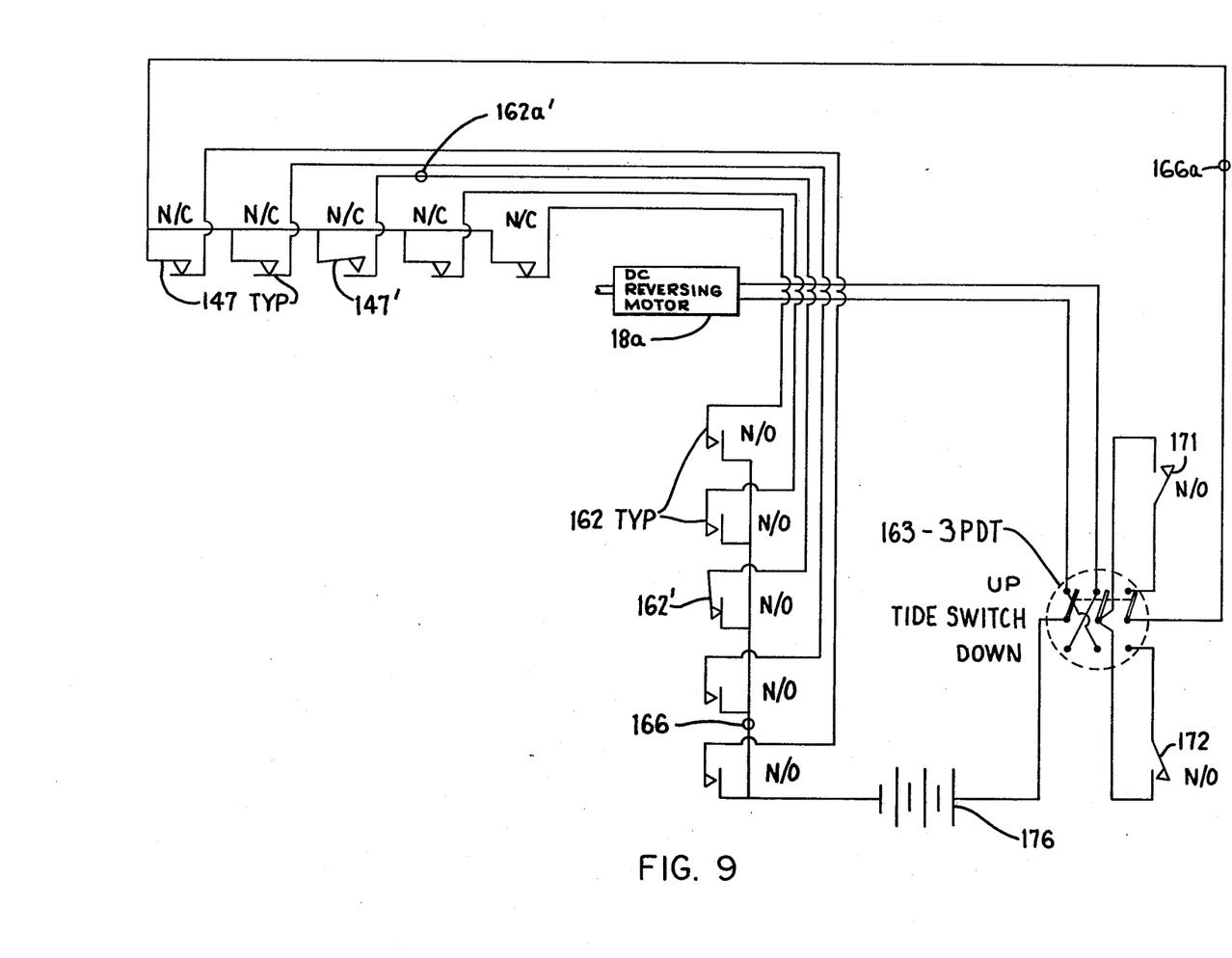
FIG. 9 is an electrical schematic of the tide adjuster circuitry.

The abovedescribed switches 147, 162, 163, 171 and 172, the reversible motor 18a and an electric power source 176, here schematically indicated as a battery, are wired together in circuit in the manner shown in FIG. 9.

Figure 1:
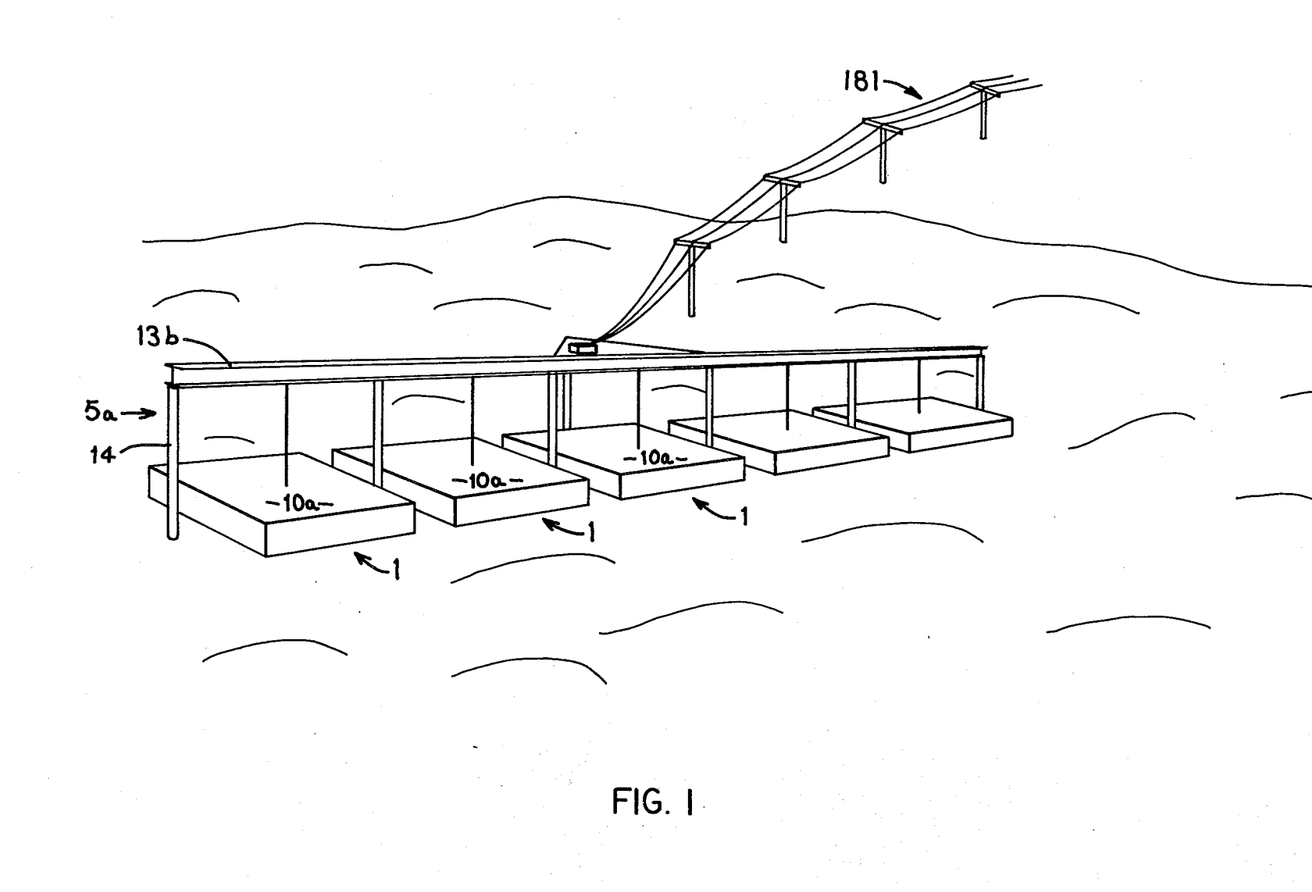
FIG. 1 is a pictorial view showing an arrangement of several interconnected wave energy converters embodying the invention.

For commercial production, a plurality of WEC units 1 may be ganged together as shown in FIG. 1, utilizing a common frame 5a having a common top beam 13b and bottom beam (not shown) supported on a plurality of pilings 14 and to support a plurality of floats 10a and related apparatus abovedescribed for generating electric current. In the FIG. 1 embodiment the individual generators 131, 135, etc. associated with each float 10a may be single or three-phase AC generators wired together (for example parallel) to apply electric power of the desired voltage and frequency to power lines 181 running from the multiple WEC's 1 to shore, for connection to the power line grid of a commercial electric power company.

If desired, the battery 176 of FIG. 9 can be replaced by, or charged by, any conventional means (such as a voltage reduction transformer and rectifier) from the power line 181 of FIG. 1 or from the output of the generator 131 or 135 of a given WEC unit 1.

OPERATION

While the operation of this apparatus has been indicated above, same will now be summarized for convenience in reference.

Figure 4A:
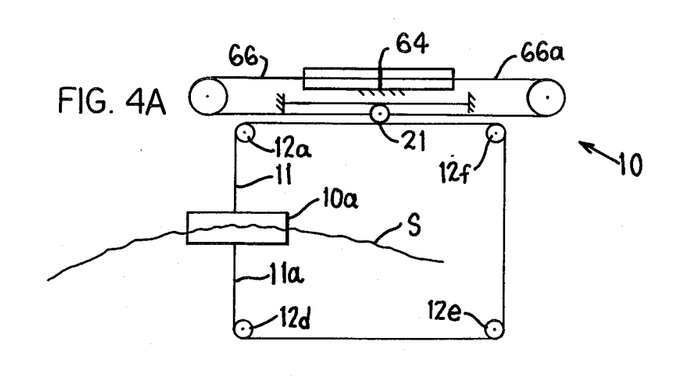
FIGS. 4A and 4B are schematic views used to show the wave action on the float of the FIG. 2 embodiment.
Figure 4B:
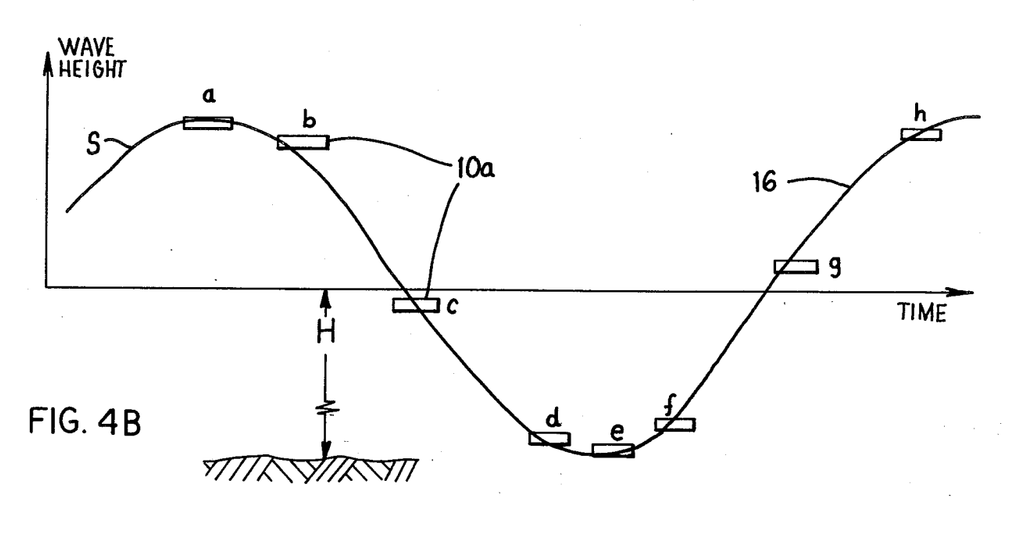

Attention is directed to the schematic view in FIG. 4A of the harnessing apparatus 10 discussed in more detail above with respect to FIG. 2 and attention is further directed to the FIG. 4B plot which shows the rise and fall of the float 10a with time during one wave cycle. It will be understood that float 10a tends to rise and fall vertically in place as waves pass therebeneath. The float positions (a) through (h) in FIG. 4B are listed below to describe the operation of the harnessing apparatus 10 as follows.

(a) Float 10a rides at peak of wave.

(b) Wave surface S falls to where buoyancy of float is no longer greater than weight of float 10a and weight of float 10a overcomes system preload forces that tend to hold the float in place.

(c) As wave surface S falls away, the weight of float 10a begins to pull piston 64 to the right, by tensioning cable 11 and pulling double purchase pulley 21 to the left so as to tension cable set 66a.

(d) When the wave surface slows in its fall, the buoyancy of float 10a again begins to take hold and to overcome the downward inertia of the float. The travel of the piston 64 slows to a stop and preload (tension) on the cables 11 and 66a begins to be removed.

(e) In the trough of the wave, float buoyancy overcomes the weight of the float 10a.

(f) As the wave surface begins to rise from its bottommost position, the buoyancy of the float 10a again overcomes the preload (resistance to movement within the cables, cylinder unit 17, etc.) to pull the piston 64 to the left, namely by tensioning cable 11a, which shifts double purchase pulley 21 rightwardly, tensions cables 66 and pulls piston 64 leftwardly.

(g) As the wave surface S rises, the buoyancy of float 10a causes it to rise and thereby continue to pull the piston 64 to the left.

(h) When the wave surface slows its rise, in approaching the peak again, the weight of the float 10a and the resistance of the cables and piston 64 to further movement to overcome the buoyancy of the float which halts its rise. The piston 64 thus stops and preload forces (cable tension and the resistance to movement of the piston 64) begin to be removed.

Waves on water are rarely in the form of perfect sine waves. Because of small fluctuations (or wavelets) superimposed on the main large waves, float movement from positions b to d and f to h often approaches zero and no work is done by the float on the "external" hydraulic circuit of FIG. 5.

It will be noted that the interposition of the double purchase pulleys 21 and cables 66 and 66a between the cables 11,11a and piston 64 double the force on the piston exerted by the float and reduce by a factor of 2 the travel of the piston 64 compared to the vertical travel of the float. The cables 11,11a, pulleys 21 and cables 66,66a in effect define a closed loop connection between the float 10a and piston 64.

The tensioners 41,41a and 67,67a are adjusted to maintain the cables 11,11a and 66,66a under sufficient tension as to guide the float 10a and traveler block 44 each along a substantially straight line path and to avoid bumping of the float 10a into the piling 14 and of the traveler block 44 into the cylinder unit 17.

In FIG. 5 as the piston 64 is pulled to the right by a downward movement of the float and consequent tensioning of piston rod 56a, hydraulic liquid is drawn from reservoir 124 through line 125 and check valve 126 into leftward cylinder chamber 111 while hydraulic fluid is forced under pressure by the piston 64 from chamber 111a through check valve 122a and into line 123 running to the accumulator 127 and to the said flow valve 128. In the same way, rising of the float 10a pulls the piston 64 to the left, filling chamber 111a from reservoir 124 and forcing hydraulic liquid from chamber 111 through check valve 122 and into the line 123 leading to accumulator 127 and constant flow valve 128.

Normally, the constant flow valve 128 takes a portion of the hydraulic liquid flow from line 123 to actuate generator 131 through hydraulic motor 129 and, if flow is sufficient, to actuate generator 135 through hydraulic motor 134 and constant flow valve 133. However, during the maximum pressure portion of the stroke of the piston 64, the constant flow valve 128 will not accept the full amount of hydraulic liquid displaced by the piston 64 and so this excess is received in accumulator chamber 127a, being forced thereinto to displace leftwardly the piston 127b against the force of gas spring 127c. The accumulator 127 thus is properly sized to be "charged" by the "excess" volume of hydraulic liquid produced by the cylinder unit 17.

Even though the surface S of the wave 16 (FIG. 4b) is constantly rising and falling, some of its motion and energy are utilized to preload the apparatus driven thereby and to overcome friction. This means that the cable 11 and 11a, and therefore the piston 64, do not move while the float resides in the area of the peak or trough of the wave, as discussed above with respect to portions (d), (e) and (f) of FIG. 4b. Therefore, the accumulator 127 is arranged to store energy during the portion of the cycle b, c, d and f, g, h of FIG. 4b wherein an excess of hydraulic liquid is outputted from cylinder unit 17. The accumulator 127 releases thus accumulated hydraulic fluid to the constant flow valve 128 and the hydraulic motors 129,134 downstream thereof during the portion of the wave cycle wherein the float is stationary or essentially stationary (as at a, h and as at d, e, f).

The tide adjuster 18 (FIGS. 6-9) in effect maintains the piston 64 substantially centered along the length of the cylinder 63 at mid-wave height (or calm water level $L_t$) despite change in the calm water level $L_t$ independent of waves and dependent on tides, substantial variation in rainfall, or other factors which may change calm water level.

Figure 8:
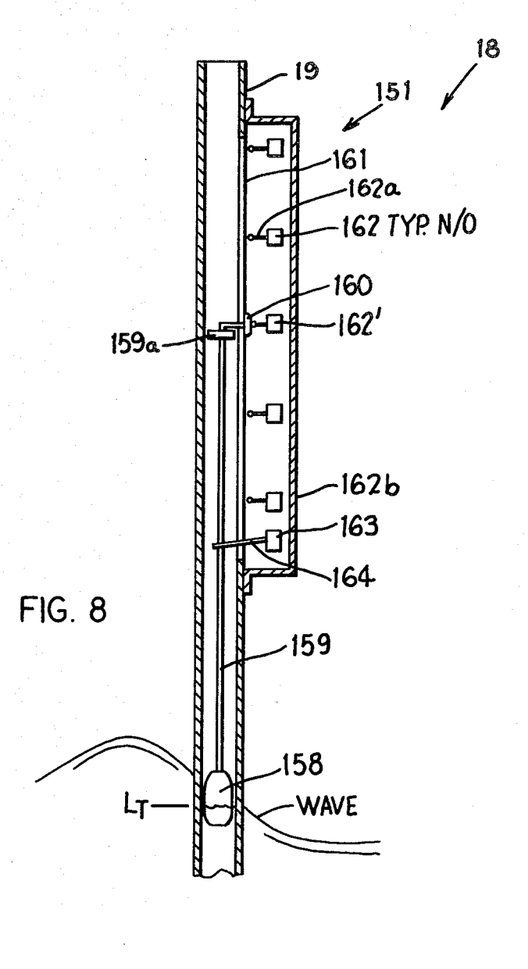
FIG. 8 is an enlarged, partially broken side view of the height sensor float and switch portion of the tide adjuster mechanism of FIG. 2.

Turning to FIG. 8, with a rising tide, the sensor float 158 rises toward its position shown in the drawing. The initial rise frictionally shifts the actuator finger 164 of switch 163 to place the tide switch 163 in its up position generally indicated in FIG. 9. Continued rise eventually brings switch actuating ramp 160 into the position shown to close the next one 162' of the normally open switch 162. Accordingly, upon closure of the switch 162' by the rising tide, one can trace a current path from the left side of battery 176 (FIG. 9) up through a common line 166 to the now closed contact of normally open switch 162', through a line 162a' to normally closed switch 147' (shown open in FIG. 9 but is in actuality still closed), through a further common line 166a to tide switch 163 and through the rightward movable contact 163a thereof to normally open switch 171. Switch 171 will be in its normally open position if the float 10a is static or is falling with a wave and will only be closed if a wave is lifting the float 10a upward at the time. In the latter instance, the current loop to the battery 176 is completed from tide switch movable contact 163a through the thus closed upstroke switch 171, tide switch movable contact 163b, the DC reversing motor 18a, tide switch movable contact 163c and the right side of the battery 176. In this way, the reversing motor 18a is not made to lift the float 10a against the force of gravity by pulling the carriage 138 (FIG. 6) rightwardly and hence lifting the float 10a when the float is static or is falling with a wave. On the contrary, the motor 18a operates to pull the carriage 138 rightwardly in FIG. 6, which by tensioning cable 11 must tend to lift float 10a, only if a wave is rising under the float and already tending to lift such float. Accordingly, the motor 18a can be a relatively small, low current draw motor since it is required primarily to shift the carriage 138 and overcome the friction associated with the screw 18b and the pulleys over which the cables 11 and 11a run, rather than to overcome the weight of the float 10a.

Operation of the reversing motor 18a continues until downward motion of the wave has opened switch 171 again or the rightward motion of the carriage 138 has continued sufficient to open the normally closed switch 147'. Opening of either the switch 147' or switch 171 breaks the current loop through the battery 176 and stops the motor 18a. It is possible that the switch 171 may open and close several times, due to the advent of several waves, before the float 10a comes up to the desired calm water position. While five switches 147 and five switches 162 are shown, it will be understood that more switches, more closely placed, can be employed so as to locate more closely together the several calm water positions available for the float 10a. It is also contemplated that different types of sensing and feedback circuits (e.g. solid state devices) can be used to control the motor 18a, including tide sensing and float position feedback systems operable to provide a virtual continuum of available calm water float positions.

The system works substantially in the same manner during a falling tide to lower the calm water position of the float 10a. More particularly, a fall in tide causes friction finger 164 to shift the contacts 163a–163c of tide switch downward out of the UP position shown in FIG. 9 to the DOWN position. Then if, and only if, the float 10a is being allowed to drop downward by reason of decrease in wave surface downward toward the trough thereof, wave direction sensing switch 172 will close. When the tide sensor float 158 has fallen with the tide sufficient to bring the switch actuating ramp 160 thereof downwardly to actuate a given switch 162, say the switch 162', the latter closes and forms a circuit path leading from battery 176 leftward through line 166, now closed switch 162', line 162a', normally closed switch 147', line 166a, tide switch contact 163a, now closed (since the wave is dropping) switch 172, tide switch contact 163b, reversed connection through the DC reversing motor 18a, tide switch contact 163c, and finally to the right side of battery 176 to complete the circuit loop and thereby actuate the motor 18a in the reversing direction, namely to shift the carriage 138 leftwardly in FIGS. 2 and 6 to thereby lower the calm water position of the float 10a, until carriage 138 has moved sufficient to cause the ramp 146 thereon to hit the actuator 147a' of switch 147', open such switch and thereby break the current path through the motor 18a to shut same off.

While adjustment up and down of the calm water position of the float 10a has been discussed above by way of example in terms of particular switches 162' and 147', it will be understood that the same action applies with respect to all of the switches 162 and 147 which are distributed along the full range of movement of the tide sensing float 158 and carriage 138.

It will be noted that the float 10a is weighted to provide sufficient force to the system when the wave goes down. The buoyancy of the float provides the force to the system when the wave goes up. The cables 11,11a are always under tension when imparting the forces acting on the float to the system.

As noted, the volumetric flow to each hydraulic motor 129 is accurately controlled to provide a constant RPM if they are used to drive alternating current generators 131 connected to a commercial power line. The accumulator 127 is sized to provide a continuous volume of hydraulic fluid under sufficient pressure to the hydraulic motor 129 while the hydraulic cylinder pump 17 is at the end of its stroke. The cylinder pump is designed to provide more fluid during the productive portion of each stroke than is required by the motor 131 so that the accumulator 127 may be temporarily charged. While no hydraulic head pressure is required in the oil supply reservoir 124, it should provide a flooded suction for the cylinder pump 17. The accumulator 127 returns a sufficient volume and pressure of hydraulic fluid to the circuit during the non-productive portion of each stroke of the cylinder pump to maintain generator RPM.

It is also contemplated that hydraulic output of several floats 10a (FIG. 1) and cylinder pumps (each with their own accumulator) may be combined by piping the hydraulic fluid therefrom to a central location through a single large constant flow valve (like valve 128) and then to a large hydraulic motor or motors (like motor 129).

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wave energy converter for harnessing energy from waves on the surface of a body of water, comprising:
   a frame fixed on and upstanding from the bottom of the body of water;
   a weighted float located to ride up and down with said waves adjacent said frame;
   a load at least in part mounted on said frame;
   means defining a closed loop connection between said float and load, said closed loop connection including alternately tensionable cables extending up and down from said float and having remote ends fixed with respect to said frame, guide pulley means on said frame guiding said cables from said float to said remote ends, and traveler means movable with respect to said frame and carrying direction change pulleys bending both said cables adjacent their fixed ends for multiplying the force applied to said traveler means by said cables, said load being connected to said traveler means for actuation thereby.

2. The apparatus of claim 1, including a tide height adjuster having carriage means carrying feeder pulleys bending said cables between said float and load and means responsive to a change in calm water height of said body of water for moving said carriage means in a direction to permit shifting of the middle of the range of vertical float movement to the new calm water height without change in the location of the range of movement of the traveler means with respect to the load.

3. The apparatus of claim 2, in which said means responsive to change in calm water height includes height sensor means including means substantially independent of wave motion and coupled to said body of water at a depth at least about twice the expected maximum wave height below the surface of the body of water for correspondingly positioning said carriage.

4. The apparatus of claim 1, in which said frame includes uprights and a beam extending between the tops thereof, said load including pressure fluid cylinder means having portions fixed on said beam and movable portions extending in opposite directions therefrom, hollow brackets fixed on said frame in flanking relation with said pressure fluid cylinder means and in flanking relation with said traveler means, direction change pulleys fixed on said beam outboard of said brackets and further cables extending from respective movable portions of said pressure fluid cylinder means through respective ones of said brackets around respective ones of said direction change pulleys and connecting to opposite ends of said traveler means, and tensioning means interposed between said pressure fluid cylinder means and traveler means for tensioning said further cables sufficient to support said traveler means for reciprocation above said pressure fluid cylinder means, said brackets mounting said remote ends of said first-mentioned cables and including means adjacent said brackets for tensioning said first-mentioned cables.

5. The apparatus of claim 1, in which said load comprises fluid pressurizing means for outputting fluid under pressure in response to rise and fall of said float, resiliently backed accumulator means receiving the output of said fluid pressurizing means, a constant flow valve receiving the output of said fluid pressurizing means and accumulator means, wherein said accumulator means maintains substantially constant the input flow and pressure to said constant flow valve despite up and down motion of said float, fluid motor means operable at a substantially constant speed in response to flow from a constant flow output of said constant flow valve, and means for returning pressure fluid in excess of said constant flow to said fluid pressurizing means from said constant flow valve.

6. The apparatus of claim 5, in which said returning means includes at least one further constant flow valve with a constant flow output connected to a further fluid motor and an excess output connected for return to said fluid pressurizing means.

7. A wave energy converter for generating power from the vertical rise and fall of the surface of a body of water, comprising:
   a frame fixed to and upstanding from the bottom of the body of water;
   a wave responsive float arranged to rise and fall with waves on the surface of the body of water and with respect to said frame;
   a load supported by said frame for driving by the rise and fall of said wave responsive float;
   adjustable drive means interconnecting said wave responsive float with said load;
   adjuster means responsive to a change in the calm water level of the surface of said body of water, wherein said adjuster means comprises:
   means for sensing a change in calm water level, including means responsive to movement of water particles at a depth below the surface of the body of water where vertical movement of water particles is substantially less than in waves at the surface of the body of water;

means responsive to said sensing means for adjusting said adjustable drive means in a direction to relocate the center of the range of float reciprocating movement with respect to said load in correspondence to the rise or fall in calm water level of the body of water.

8. The apparatus of claim 7, in which said means responsive to movement of water particles comprises an upstanding tube fixed to said frame and extending from near the top of the frame down through the surface of the body of water to a location at least about twice expected maximum wave height, said tube being open at the top and bottom, a sensing float riding at the water level in said tube, tide switch means switchable in response to initial upward and initial downward movement of said sensing float so as to discriminate between rising and falling movements of the calm water level of said body of water, first position switch means actuable in response to the height at which the sensing float is located, said adjustable drive means including a movable carriage repositionable to relocate the center of the range of wave responsive float movement with respect to said load, second position switch means actuable in dependence on the existing position of the carriage and means interconnecting said tide switch, first position switch means and second position switch means for repositioning of said carriage in response to and in direction corresponding to a change in position of said sensing float.

9. The apparatus of claim 8, in which said adjuster means further includes wave switch means switchable upon initiation of up movement or upon initiation of down movement, respectively, of said wave responsive float and being responsive to vertical wave motion, said wave switch means being connected in circuit with said tide switch, first position switch means and second position switch means for disabling said circuit except where a rise in the sensing float is accompanied by raising of the wave responsive float by a wave and where a fall in the sensing float is accompanied by falling of the wave responsive float with a wave.

* * * * *